United States Patent
Gneuss

Patent Number: 5,605,626
Date of Patent: Feb. 25, 1997

[54] PLATE SIEVE CHANGER

[75] Inventor: Detlef Gneuss, Bad Oeynhausen, Germany

[73] Assignee: Gneuss Kunststofftechnik GmbH, Bad Oeynhausen, Germany

[21] Appl. No.: 455,282

[22] Filed: May 31, 1995

[30] Foreign Application Priority Data

Jun. 1, 1994 [DE] Germany ............... 44 19 284.3

[51] Int. Cl.$^6$ ............................................. B01D 29/96
[52] U.S. Cl. ................. 210/236; 210/447; 210/450; 425/135; 425/143; 425/185; 425/192 R; 425/199
[58] Field of Search .................. 425/135, 143, 425/185, 186, 190, 192 R, 197, 198, 199; 210/236, 447, 450

[56] References Cited

U.S. PATENT DOCUMENTS

| | | | |
|---|---|---|---|
| 3,653,419 | 4/1972 | Schutter | 425/199 |
| 3,768,661 | 10/1973 | Coates | 425/198 |
| 3,856,277 | 12/1974 | Tiramani | 425/197 |
| 4,277,338 | 7/1981 | Hoagland | 425/199 |
| 4,358,262 | 11/1982 | Herbert | 425/197 |
| 5,269,540 | 12/1993 | Nobuchi et al. | 277/229 |
| 5,362,223 | 11/1994 | Gneus | 425/185 |
| 5,439,589 | 8/1995 | Whitman | 425/197 |

FOREIGN PATENT DOCUMENTS

| | | | |
|---|---|---|---|
| 2481998 | 11/1987 | France . | |
| 1198537 | 8/1965 | Germany . | |
| 135595 | 5/1979 | Germany | 425/197 |
| 3043217C2 | 6/1982 | Germany . | |
| 4419284C1 | 10/1995 | Germany . | |
| 1407828 | 7/1988 | U.S.S.R. | 425/199 |
| 2017518 | 10/1979 | United Kingdom . | |

Primary Examiner—Jay H. Woo
Assistant Examiner—Joseph Leyson
Attorney, Agent, or Firm—Herbert Dubno; Yuri Kateshov

[57] ABSTRACT

The seals between the plates and a swingable or slidable sieve insert carrier can be hollow to receive a substance having a greater coefficient of thermal expansion than the metal shell of the seal so that the pressing force is generated by expansion of the substance.

19 Claims, 5 Drawing Sheets

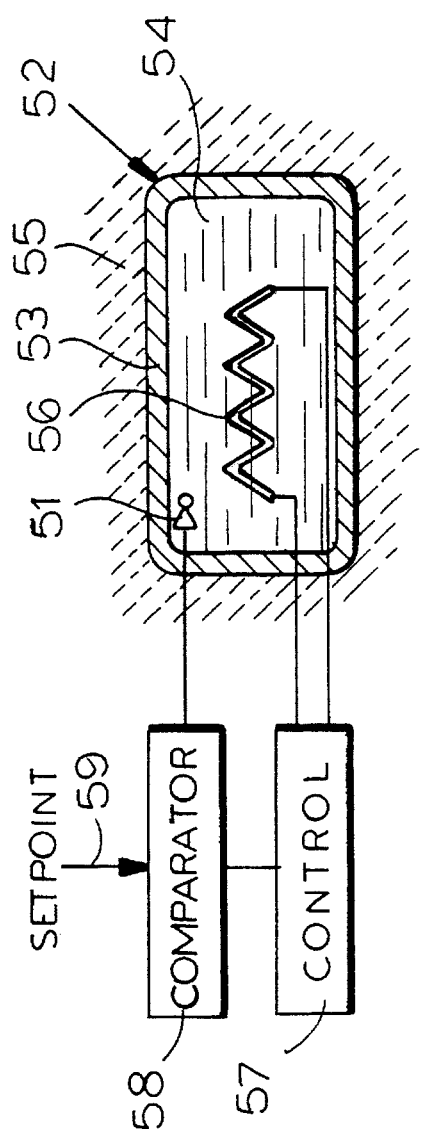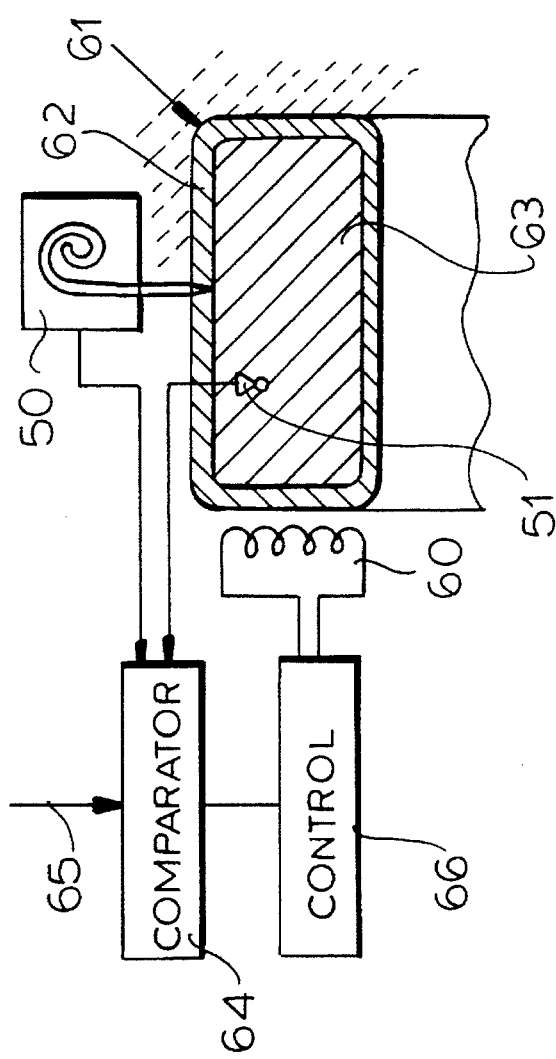

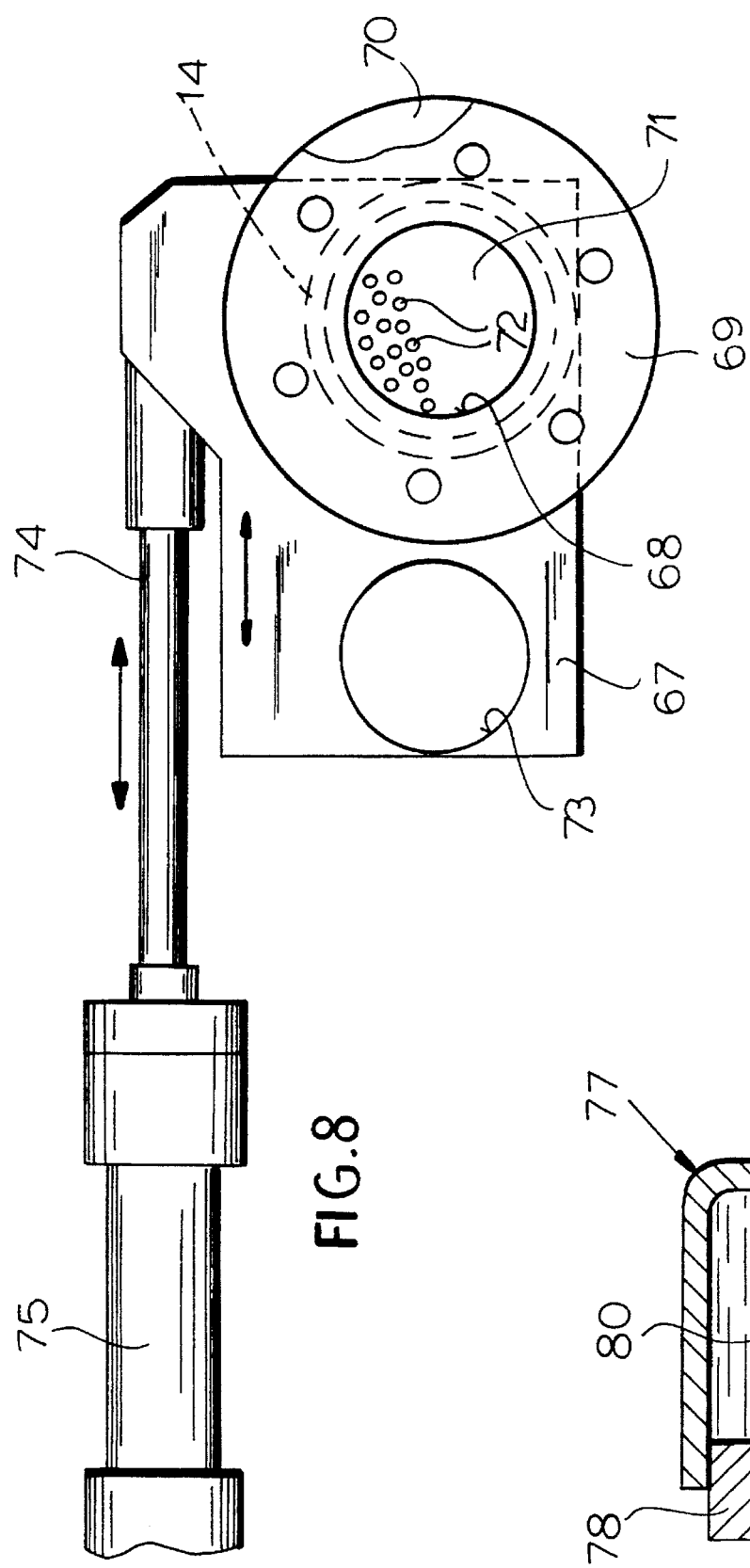
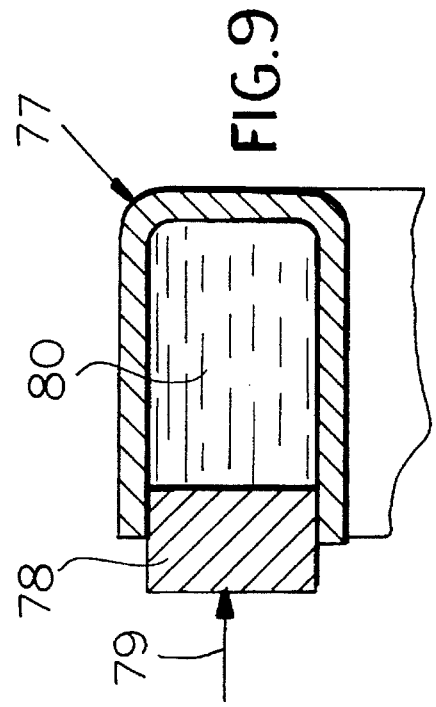

PLATE SIEVE CHANGER

FIELD OF THE INVENTION

My present invention relates to a filter device for molten plastic with sieve inserts arranged in openings in a power-driven swivelling element or a power-driven slide gate located between two plates, whereby one of the sieve inserts can be flush with a melting channel which penetrates the plates and is equipped with seals on both sides which are held against the element or slide gate.

BACKGROUND OF THE INVENTION

My commonly assigned U.S. Pat. No. 5,362,223 describes a plate sieve changer of a type in wide use for filtering molten plastic. In order to replace the sieve, the pivotal element or slide gate can be swung in a very short time, by means of a pressure-applying device, for example, so that a ram of the extruder feeding the plastic through the plate sieve can pass through without obstruction. The swinging motion allows changeover of the sieves as well. However, the seals which separate the melting channel from the pivotal element or slide gate have proven to be problematic. These seals should allow reliable and/or absolute sealing of the pivotal element even at high melting pressures of up to 400 bar at high melting temperatures and with low-viscosity molten plastic.

In addition, wear on the surfaces of the seals should be as slight as possible, so that practically absolute sealing is guaranteed even after frequent sieve replacements have taken place.

Although the use of elastic seals has been tried, they are not in widespread use due to their low degree of stability at the high temperatures indicated above.

Seal rings made of steel have been employed. These rings, relatively resistant to wear, begin to lose their sealing properties even after slight damage to the surface or the seat of the seal so that softer/tougher metals are in more widespread use, e.g. aluminum-bronzes, which can adapt more easily to slight unevenness.

The actual contact pressure can be set, for example, by means of set screws/screw threads. It is also possible to employ or interpose springs in order to achieve as constant a contact pressure as possible.

A hydraulic adjustment system having hydraulically-operated tappets distributed around the perimeter of the seal ring which influence the seal ring is known from DE-PS 19 19 269. A sealing body in the form of a supporting hydraulic ring space enclosed by metal bellows is known from DE-PS 30 43 217.

However, it has been seen that although the adjustability of the contact pressure to desired values is advantageous, and allows an adjustment to the temperature, the pressure and the viscosity of the molten plastic to the filtered, the adjustment of contact pressure by means of screws, screw threads and such like has proven to be complicated, while seals adjusted by means of a pressure-applying device are costly.

OBJECTS OF THE INVENTION

The object of the invention is to provide a device which is equipped with seals having a high degree of reliability in operation and a long life, but which can be mounted without problems and which can be adjusted to the prevailing working conditions.

Another object is to provide an improved apparatus for filtering molten plastic which obviates drawbacks of earlier devices.

SUMMARY OF THE INVENTION

These objects are attained, in accordance with the invention, by providing seals which have sealing bodies of metal and are filled with a substance whose thermal expansion coefficient exceeds that of the sealing body. This allows the installation of seals in a state of relatively low tension so that mounting offers no considerable difficulties, and only slight tension must be applied when mounting, while heating up during operation causes the pressure in the hollow space to increase to such an extent through the thermal expansion of the filler substance that at least the end surface facing the ram-element moves or arches forwards under the effect of the pressure and applies itself firmly to the pivotal element/slide gate and/or the end surface of the sieve insert thereby securely sealing.

According to a feature of the invention, the substance filling the hollow space of the metallic sealing body is a molten metal or metal alloy and is at least molten at the operating temperature. It can also be an element of organic or inorganic compound or mixture which is molten at least at the operating temperature and may be a solid body or a solid mixture or a liquid at room temperature and can be a gas, preferably a pressurized gas within the temperature range of the operating conditions and above room temperature, but possibly below the operating range.

According to another feature of the invention thermosensors reacting to the temperature of the seals and/or pressure sensors reacting to the pressure within the seals are provided.

Heating elements can contact the seals or be integrated into the sealing bodies and electrical resistance or induction heating elements can be provided as desired.

The heating devices can be connected in circuit for regulating the pressure or temperature.

Advantageously, surfaces of the sealing bodies can be insulated against heat loss.

It has been found to be advantageous, moreover, to provide the end face of the seals which are intended to contact the swingable element or the slide gate with a smaller surface area than the base of the seal or, in an alternative construction, with a larger area than the base. An edge area surrounding the end face of the seal contacting the swingable element or the slide gate can have a reduced wall thickness and preferably is of a wavy shape and, in general, areas of the outer and/or inner walls of the sealing bodies can be of reduced wall thickness compared to other walls and/or can be of a wavy shape.

The seals can, if desired, have adjustable displacement bodies which can bear upon the substance in the hollow space of the seal.

The apparatus in general terms can comprise a pair of plates having axially aligned openings;

a movable element between the plates formed with at least one sieve insert displaceable by the element between a position in which the sieve insert registers with the opening for filtration of a molten plastic forced through the openings and a position wherein the sieve insert is out of registry with the openings;

means for displacing the element relative to the plates; and respective annular seals surrounding the openings and fitting between the plates and the element for sealing between the plates and the element, at least one of the seals comprising a hollow metal sealing body enclosing a closed space filled with a substance having a thermal expansion coefficient greater than that of the body.

BRIEF DESCRIPTION OF THE DRAWING

The above and other objects, features, and advantages will become more readily apparent from the following description, reference being made to the accompanying drawing in which:

FIG. 6 is a diagrammatic cross sectional showing one method of controlling temperature or pressure within the hollow seal of the invention;

FIG. 7 is a view similar to FIG. 6 illustrating another control system;

FIG. 8 is a view similar to FIG. 1 but wherein the sieve insert is on a slide gate; and FIG. 9 is a sectional view illustrating the application of a displacement body in the context of the invention.

SPECIFIC DESCRIPTION

Figure 1:
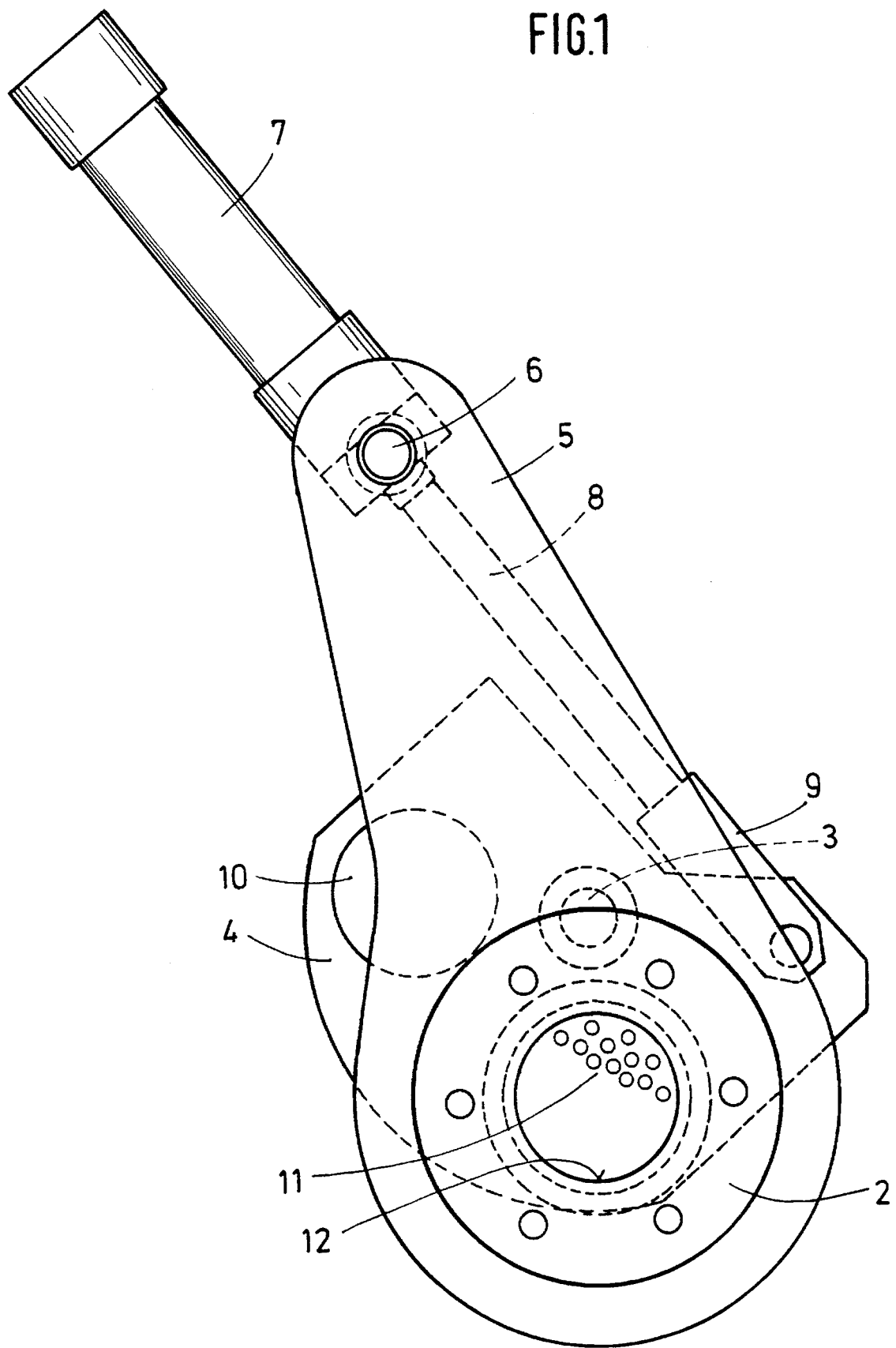
FIG. 1 is a side view of a sieve changer.
Figure 2:
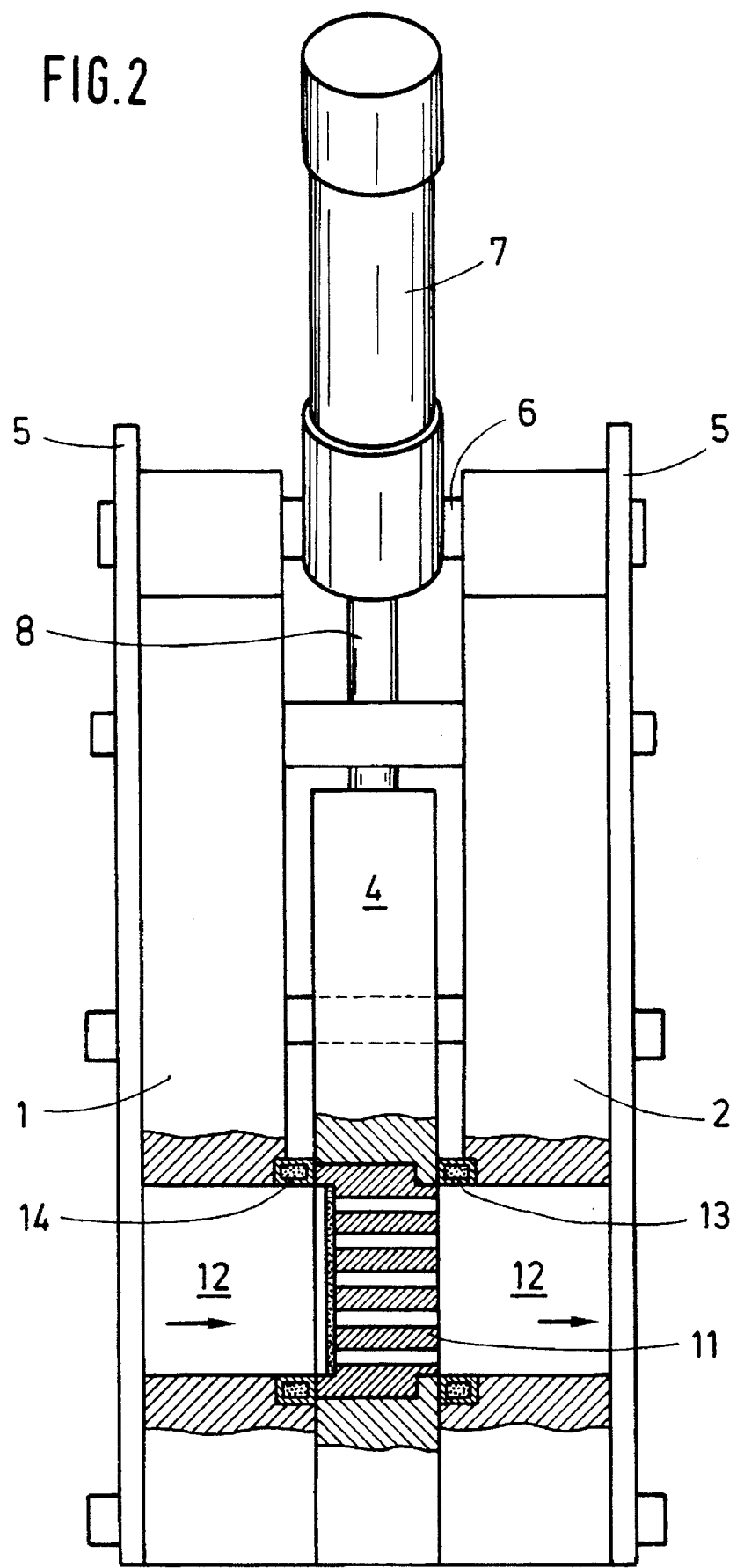
FIG. 2 is an elevational view of the plate sieve changer shown in FIG. 1 as seen from the side of the melting channel and partly broken away.

FIGS. 1 and 2 show side and front views of a plate sieve changer having a swivelling element 4 between two plates 1 and 2, pivotable about an axis 3 and mounted on a frame 5. Steel plates hold a pressure cylinder 7 swivelling around pins 6 and the means for driving the pivot element 4. The piston rod 8 of the pivot cylinder 7 is connected to the pivot element 4 by means of a shank 9.

The pivot element 4 has two basically cylindrical openings 10 to accept the sieve inserts 11. One of the two openings 10 is shown in FIGS. 1 and 2 in alignment with the melting channel 12 extending through the plates 1 and 2. Seals 13 and 14 are let into extensions of this melting channel and are intended to seal off the melting channel 12 of the plates 1 and 2 from the two flanks of the pivot element 4, and if necessary, also directly from peripheral surfaces of the sieve inserts 11.

Figure 3:
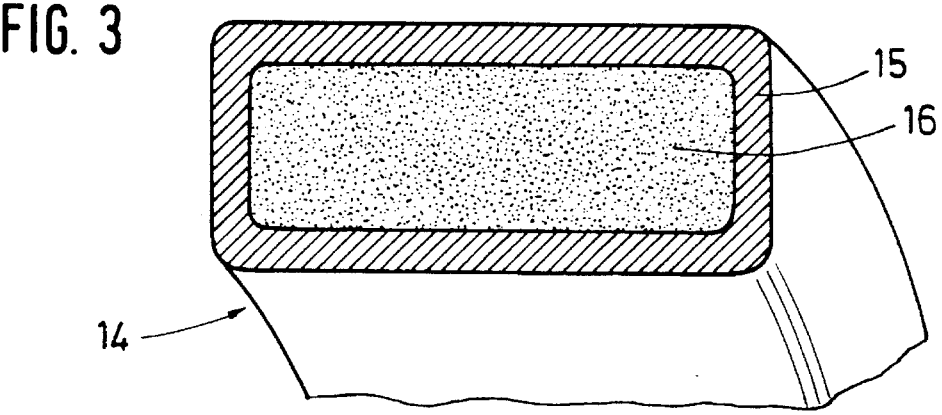
FIG. 3 is a transverse section through a seal on the plate sieve changer shown in FIGS. 1 and 2.

The seal 14 is shown enlarged and in section in FIG. 3. It can be seen from this Figure that the seal has a sealing body 15 in the form of a short hollow cylinder with the hollow rectangular cross section, the interior of which is filled with substance 16 which is liquid at least at the operating temperature of the seal 14 and which has a greater expansion coefficient than the metal of the hollow body indicated as sealing body 15 of seal 14.

Upon inserting the seal whose sealing body 15 is made of metal, e.g. stainless steel, the seal is practically tension-free. When heated by the molten plastic flowing through the substance in the hollow body expands. As the substance inside, e.g. a liquid, has a greater expansion coefficient than the actual sealing body, the latter is additionally expanded from within by the greater expansion rate of the filler substance and is thereby deformed. The seal is then pressed against the surfaces confining it with a very high force. This means that the insertion of the seals is relatively simple when assembly is performed with seals 13 and 14 in an as yet unexpanded state, as their expansion, and therefore tension occurring upon insertion, has not yet reached the contact pressures to be achieved during operation. However, during operation and after the thermal expansion/deformation has occurred, the end surface facing the swivel element is firmly pressed against it, thus sealing this element.

Figure 4:
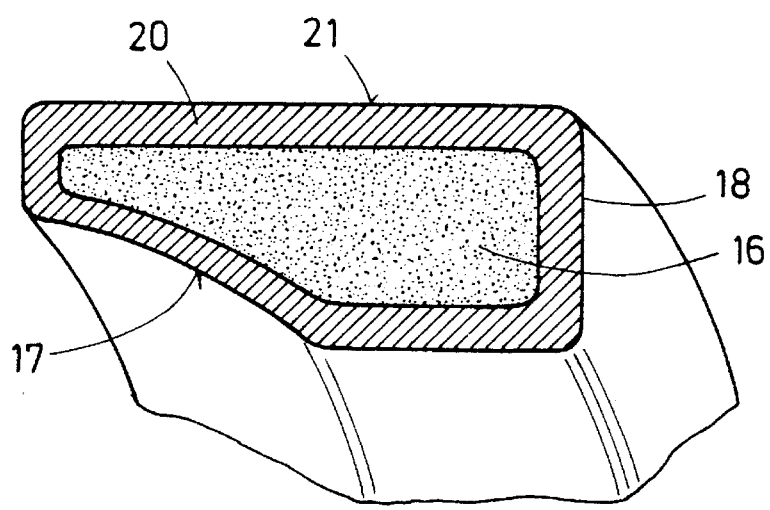
FIG. 4 is a similar view of a modified seal for pate sieve changers in accordance with FIGS. 1 and 2.

The effect of increasing the contact pressure can be increased considerably through forming the sealing body in a particular way. For example, additional use can be made of the pressure in the molten plastic mass by providing the molten plastic mass with a relatively large, say roughly conical, flank 17 (see FIG. 4) on which it is able to exert forces with components acting axially which add to the pressure of the end surface 18 against the swivel element 4 or a slide gate.

Figure 5:
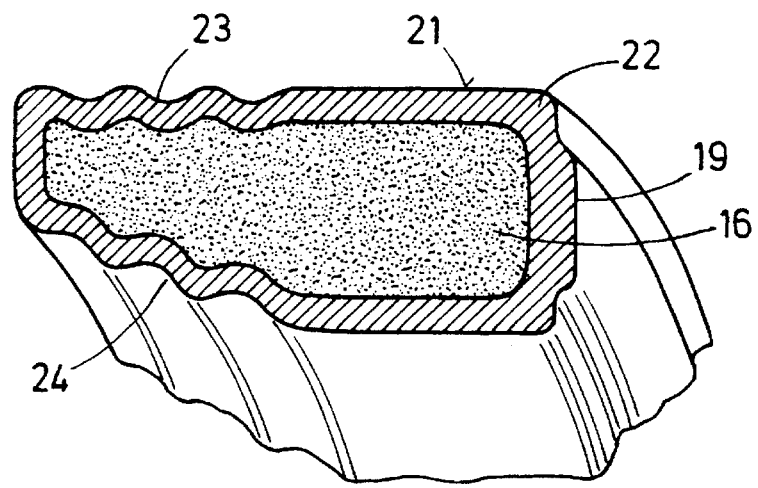
FIG. 5 is another view similar to FIG. 3 showing another variation.

It has proven to be particularly advantageous to use shapes such as indicated in FIG. 5, for example, in which the outer jacket 21 of the sealing body 22—in any case supported by the plates 1 and 2—is made thin at least in places, in order to gain more volume for the thermally expanding substance, although being thicker in free-standing surrounding areas, in order to provide support against unwanted deformations. As a deformation is particularly desirable in the form of expansion in an axial direction, it is recommended that areas 23 and 24 be thinner than the surrounding areas and possibly to be designed with waves, in order to facilitate the expansion in an axial direction. However, it is also possible, for example, to design the area around the edges of the end plate lying against a pivotal element/slide gate to be thinner and possibly to have waves, in order to achieve an increase in elasticity in the axial direction by means of forward-moving membranes encompassed by a hinge. This enhances the effect of using the three-dimensional thermal expansion of the substance 16 for a one-dimensional translatory forward motion of the face 18, 19.

The contact surface on the swivel element of the sealing body 22, with the end face 19, is reduced by the protuberance of a relatively narrow ring area, so that this contact occurs with a high degree of surface pressure whereby an increase in the pressure of the molten plastic mass also beings about an increase in contact pressure. However, particularly when using molten plastic under high pressure, or at least high pressure peaks, e.g. up to 2000 bar in the case of injection molding machines, it can prove expedient, in order to limit the contact pressure, to design the surface against the swivel element/slide gate (face 19) to be large, e.g. larger than the cross-section of the sealing body 22, in order to avoid undesirably high contact pressures by means of a large contact surface.

The sealing body can still be designed to be relatively large, in order to achieve a correspondingly large inner volume. However, a proven method has also been, for example, to measure the pressure built up directly as pressure occurring in the filler substance (via the pressure detector 50 of FIG. 7), or to indirectly indicate it as temperature via the temperature sensors 51 of FIGS. 6 and 7. Regulating procedures can be applied here, particularly if specific additional warming is provided by means of electrical heating (e.g. resistive heater 56 of FIG. 6 or inductive heater 60 of FIG. 7) placed in the vicinity of the seal or by integrated heating elements/strips or similar on or in its walls, whereby such heating for its part allows the desired sealing contact pressures to be achieved. In the case of a thermal control the jacket of the seal can be insulated from the plate holding it by an insulating layer 55, in order to limit heat loss. Another proven method—particularly in conjunction with the pressure sensors measuring the pressure within the seal—is to control or regulate the pressure in the substance filling the seal, and thereby the forces exerted by the end plate of the seal, by means of a displacing body, whose entrance into the inner space available to the thermally expanding substance is adjustable and which can reduce/limit the space.

Metals or metal alloys with high thermal expansion coefficients can be employed as the substance. These are melted at the same temperature as the molten plastic mass to be filtered. However, any other organic or inorganic compounds, elements or mixtures/solutions can be employed provided they are liquid at the operating temperature and provide to be resistant to aging and do not decompose. Any other substance can be selected which, for example, can be liquid at room temperature, possible even solid bodies, and which evaporate when heated beyond their liquid phase so that apart from thermal expansion, the build-up of gas pressure is useful and gases can be employed which are in a gaseous state at the ambient temperature and preferably already pressurized. In view of their favorable thermal expansion coefficients it would in principle be possible to employ organic plastics whose aggregate state does not alter and are thus, for example, already liquid at the ambient temperature and remain so under working conditions or are quasi-solid bodies at both the ambient temperature and under working conditions, just as melting and/or evaporating plastics can be employed within or even before the onset of working conditions criteria.

The following examples of substances having great thermal expansion properties can be employed: glycerine, melting plastics, but also evaporating organic or inorganic plastics within or before the onset of working conditions criteria. Alloys such as Wood's metal (a mixture of tin and lead) can also be employed, although metals do not usually possess a large enough thermal expansion coefficient. Mercury is not taken into consideration due to its toxicity.

Especially in the case of a possible power-driven, adjustable displacement body and/or auxiliary heating, preferably electric, but not limited to this, a regulating device can be set up and the pressure values or instead the temperature values can be fed to process computers for processing. If such auxiliary heating is employed it can prove expedient to insulate the seals at least in part, e g. the outer jacket from the plates bearing the seals.

Referring now in greater detail to FIG. 6, it can be seen that a seal 52 whose metal shell 53 surrounds a molten or meltable substance 54 whose coefficient of thermal expansion is greater than that of the shell, can be surrounded by a layer 55 of thermal insulation. It can also enclose an electrical resistance heater 56 whose control 57 is operated from a comparator 58 in response to a difference between a set point signal supplied at 59 and a temperature signal supplied by a thermistor or other temperature sensor 51.

In this case, the temperature of the substance 54 and hence the degree of expansion of the shell is controlled by monitoring the temperature thereof utilizing resistive heating to bring about the expansion.

An inductive heater 60 can be provided adjacent or in contact with the seal 61 whose metal shell 62 encloses a solid body 63 such as a ferromagnetic meltable alloy responsive to the indicative heating from the coil 60, so that, at the operating temperature, the substance is melted. Either the temperature of the substance (via the temperature sensor 51) or the pressure of the liquified substance 63, as detected by the pressure-measuring sensor 50, can be used as the input to a comparator 64 receiving a set point value at 65 and supplying a control signal to the controller 66 for the induction coil 60.

In FIG. 8, I have shown a slide gate 67 which passes between the two plates provided with the openings 68 and one of which can be seen at 69 while the other plate is visible at 70. The sieve insert 71 with its perforations 72 is here mounted on the slide plate 67 which has an opening 73 alignable with the opening 68 when the sieve insert 71 is shifted out of registry with the openings 68. In this case, the element against which the seals 14 are pressed by expansion of the internal substance, is a linearly shiftable member displaceable by a cylinder 74 and a piston rod 75.

In FIG. 9 the seal 77 is shown to receive a displacement body 78 adjustable in the direction of arrow 79 to bear upon the substance 80 having the coefficient of thermal expansion greater than that of the metal shell. The adjustability represented at 79 can be provided by some power drive, for example, a hydraulic cylinder or a screw-type mechanical drive.

I claim:

1. A filter device for molten plastic, comprising:

a pair of plates having axially aligned openings;

a movable element between said plates formed with at least one sieve insert displaceable by said element between a position in which said sieve insert registers with said openings for filtration of a molten plastic forced through said openings and a position wherein said sieve insert is out of registry with said openings;

means for displacing said element relative to said plates; and respective annular seals surrounding said openings and fitting between said plates and said element for sealing between said plates and said element, at least one of said seals comprising a hollow metal sealing body enclosing a closed space filled with a substance having a thermal expansion coefficient greater than that of said body.

2. The filter device defined in claim 1 wherein said substance is a molten metal or metal alloy.

3. The filter device defined in claim 1 wherein said substance is one selected from the group of an element, an organic compound, an inorganic compound, a mixture, and an alloy which substance is molten at an operating temperature of said device.

4. The filter device defined in claim 1 wherein said substance is a solid or liquid at room temperature and a gas at an operating temperature of said device.

5. The filter device defined in claim 1 wherein said substance is a pressurized gas at an operating temperature of said device.

6. The filter device defined in claim 1, further comprising a temperature sensor at said one of said seals for monitoring expansion thereof.

7. The filter device defined in claim 1, further comprising a pressure sensor at said one of said seals responsive to pressure of said substance for monitoring expansion of said one of said seals.

8. The filter device defined in claim 1, further comprising a heating element for heating said one of said seals.

9. The filter device defined in claim 8 wherein said heating element is in said one of said seals.

10. The filter device defined in claim 8 wherein said heating element is in contact with said one of said seals.

11. The filter device defined in claim 8 wherein said heating element is an electrical resistance heater.

12. The filter device defined in claim 8 wherein said heating element is an induction heater.

13. The filter device defined in claim 8, further comprising means including said heating element for regulating expansion of said substance.

14. The filter device defined in claim 1, further comprising a layer of thermal insulation on at least one surface of said one of said seals.

15. The filter device defined in claim 1 wherein an end face of said one of said seals adapted to contact said element has a smaller surface area than a base of said one of said seals.

16. The filter device defined in claim 1 wherein an end face of said one of said seals adapted to contact said element has a larger surface area than a base of said one of said seals.

17. The filter device defined in claim 1 wherein an end face of said one of said seals adapted to contact said element is flanked by edge areas of reduced wall thickness.

18. The filter device defined in claim 1 wherein an end face of said one of said seals adapted to contact said element is flanked by edge areas of wavy configuration.

19. The filter device defined in claim 1 wherein at least one wall of said one of said seals is of wavy configuration.

* * * * *